United States Patent
Li et al.

(10) Patent No.: US 12,222,206 B2
(45) Date of Patent: Feb. 11, 2025

(54) IMAGE PROCESSING METHOD AND VEHICLE, AND READABLE STORAGE MEDIUM

(71) Applicant: Xiaomi EV Technology Co., Ltd., Beijing (CN)

(72) Inventors: Hao Li, Beijing (CN); Beisheng Zeng, Beijing (CN)

(73) Assignee: Xiaomi EV Technology Co., Ltd., Beijing (CN)

( * ) Notice: Subject to any disclaimer, the term of this patent is extended or adjusted under 35 U.S.C. 154(b) by 324 days.

(21) Appl. No.: 17/852,772

(22) Filed: Jun. 29, 2022

(65) Prior Publication Data

US 2023/0273028 A1    Aug. 31, 2023

(30) Foreign Application Priority Data

Feb. 25, 2022  (CN) .......................... 202210179315.1

(51) Int. Cl.
- *G06T 3/60* (2024.01)
- *G01C 21/30* (2006.01)
- *G06T 3/08* (2024.01)
- *G06T 11/00* (2006.01)
- *H04N 23/698* (2023.01)
- *B60W 60/00* (2020.01)

(52) U.S. Cl.
CPC ................ *G01C 21/30* (2013.01); *G06T 3/08* (2024.01); *G06T 3/60* (2013.01); *G06T 11/001* (2013.01); *H04N 23/698* (2023.01); *B60W 60/001* (2020.02); *B60W 2420/403* (2013.01)

(58) Field of Classification Search
None
See application file for complete search history.

(56) References Cited

U.S. PATENT DOCUMENTS

| 2011/0221759 A1* | 9/2011 | Motomura .............. G06T 15/04 |
| | | 345/582 |
| 2019/0019335 A1* | 1/2019 | Elangovan ............ G06T 19/006 |
| 2019/0325580 A1 | 10/2019 | Lukac et al. |

(Continued)

FOREIGN PATENT DOCUMENTS

| CN | 110706282 A | 1/2020 |
| CN | 111959397 A | 11/2020 |

(Continued)

OTHER PUBLICATIONS

Extended European Search Report issued on May 22, 2023 for European Patent Application No. 22181730.7.

*Primary Examiner* — Aaron M Richer
(74) *Attorney, Agent, or Firm* — Volpe Koenig (57) ABSTRACT

An image processing method includes: obtaining a real-time pose of a vehicle, and obtaining a first number of initial texture images; obtaining a first texture image corresponding to each initial texture image according to the real-time pose and each initial texture image; obtaining second texture images by converting the first texture images to a coordinate system in which the vehicle is positioned and obtaining an area corresponding to a bottom of the vehicle; and obtaining a target image, representing a scene of the bottom area of the vehicle, by performing hybrid rendering on the second texture images corresponding to the first number of initial texture images.

19 Claims, 4 Drawing Sheets

Match a bottom area of the vehicle in a first texture image, corresponding to each initial texture image, with a vehicle-bottom passing area by converting the first texture image to the coordinate system in which the vehicle is positioned — 51

Obtain a first number of bottom area images by obtaining a bottom area image of the bottom area of the vehicle in each first texture image, and use the bottom area images as second texture images — 52

(56) References Cited

U.S. PATENT DOCUMENTS

| | | | | |
|---|---|---|---|---|
| 2021/0027522 A1* | 1/2021 | Dabral | ................. | H04N 13/111 |
| 2022/0067955 A1* | 3/2022 | Lee | ........................ | G06N 3/045 |
| 2022/0138896 A1* | 5/2022 | Hou | ........................ | G01S 19/45 |
| | | | | 382/100 |
| 2023/0237728 A1* | 7/2023 | Wang | ...................... | G06T 17/10 |
| | | | | 345/426 |

FOREIGN PATENT DOCUMENTS

| | | |
|---|---|---|
| CN | 113302648 A | 8/2021 |
| CN | 113516733 A | 10/2021 |

\* cited by examiner

Fig. 1

Obtain inertial data collected by an inertial sensor of the vehicle, the number of a pulse collected by a pulse sensor of the vehicle, and a previous position and a previous navigation angle of a previous cycle of the vehicle ~21

Compute, based on a preset pose model, a real-time pose of the vehicle in a current collection cycle according to the inertial data, the pulse data, the previous position and the previous navigation angle, where the real-time pose includes a current position and a current navigation angle of the vehicle ~22

Fig. 2

Obtain a pose of the vehicle in each collection cycle, and obtain a panoramic image of each collection cycle, where each panoramic image is formed by splicing images collected by at least four cameras arranged on the vehicle ~31

Obtain deformed texture images by rendering and deforming the panoramic images ~32

Obtain the initial texture images by binding the pose of the vehicle and the deformed texture images ~33

IMAGE PROCESSING METHOD AND VEHICLE, AND READABLE STORAGE MEDIUM

CROSS REFERENCE TO RELATED APPLICATIONS

The present application claims priority to Chinese Patent Application No. 202210179315.1, filed on Feb. 25, 2022. The entire contents of the above-listed application are hereby incorporated by reference for all purposes.

BACKGROUND

As for unmanned driving, computers can automatically operate vehicles with cooperation of artificial intelligence, visual computing, radars, monitoring devices and global positioning systems without any active human operation.

SUMMARY

The disclosure relates to the field of image processing, in particular to an image processing method and a vehicle, and a readable storage medium.

According to a first aspect of an embodiment of the present disclosure, an image processing method is provided and includes:
  obtaining a real-time pose of a vehicle, and obtaining a first number of initial texture images;
  obtaining a first texture image corresponding to each initial texture image according to the real-time pose and each initial texture image;
  obtaining second texture images by converting the first texture images to a coordinate system in which the vehicle is positioned and obtaining an area corresponding to a bottom of the vehicle; and
  obtaining a target image, representing a scene of the bottom area of the vehicle, by performing hybrid rendering on the second texture images corresponding to the first number of initial texture images.

According to a second aspect of an embodiment of the present disclosure, a vehicle is provided and includes: a vehicle body, and a memory and a processor arranged on the vehicle body, where
  the memory is configured to store a computer program executable by the processor; and
  the processor is configured to execute the computer program in the memory to implement the method according to the first aspect.

According to a third aspect of an embodiment of the present disclosure, a non-transitory computer-readable storage medium is provided. When executed by a processor, an executable computer program in the storage medium may implement the method according to the first aspect.

It is to be understood that both the foregoing general description and the following detailed description are illustrative and explanatory and are not restrictive of the present disclosure.

BRIEF DESCRIPTION OF THE FIGURES

The accompanying drawings, which are incorporated in and constitute a part of this specification, illustrate examples consistent with the disclosure and, together with the description, serve to explain the principles of the disclosure.

DETAILED DESCRIPTION

Description will herein be made in detail to examples, examples of which are illustrated in the accompanying drawings. When the following description refers to the accompanying drawings, the same numbers in different accompanying drawings refer to the same or similar elements unless otherwise indicated. The following examples illustratively described do not represent all examples consistent with the disclosure. Rather, they are merely examples of apparatuses consistent with some aspects of the disclosure as detailed in the appended claims. It will be noted that features in the following examples and implementation modes can be combined without conflicts.

At the present time, being limited by the number of sensors, existing unmanned vehicles have a blind field of view, which leads to unsafe driving in some special scene and poor use experience.

To solve the above technical problem, examples of the disclosure provide an image processing method which is applied to a processor on a vehicle. The processor may be a processor or a controller of a unmanned control system of a vehicle, and may be used in a scene of an unmanned vehicle; and the processor may also be a processor or a controller of a drive assistant system of a vehicle, and may be used in a vehicle with a drive assistant function to replace a driver to drive in some scenes. In other words, the processor may have at least an image processing function to obtain a corresponding target image provided for the unmanned control system or the driver, so as to expand a field of view and improve driving safety. For convenience of description, in the subsequent examples of the disclosure, the above image processing method is implemented by using a processor of a vehicle as an execution subject, but the disclosure is not limited thereto.

Figure 1:
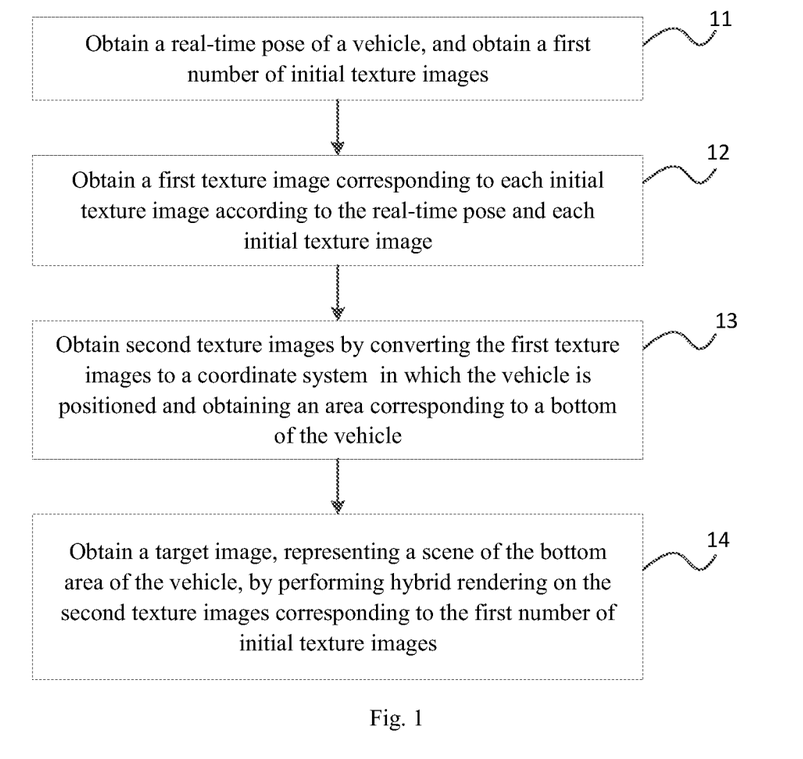
FIG. 1 is a flowchart of an image processing method according to an example.

FIG. 1 is a flowchart of an image processing method according to an example. With reference to FIG. 1, an image processing method includes steps 11-14.

In step 11, a real-time pose of a vehicle is obtained, and a first number of initial texture images are obtained.

Figure 2:
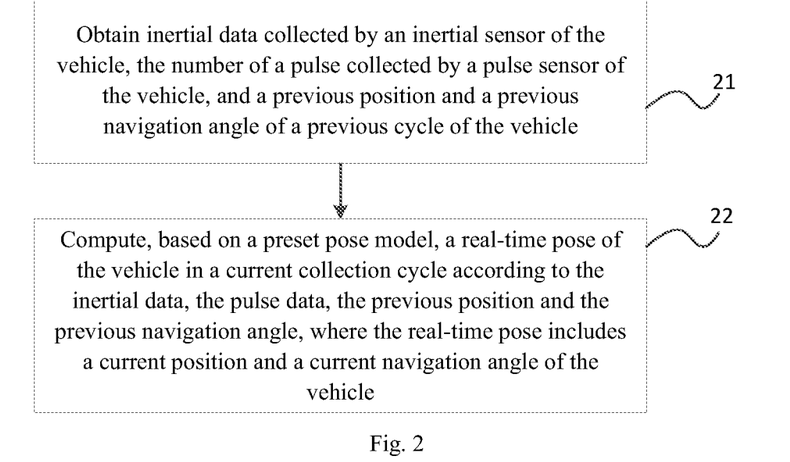
FIG. 2 is a flowchart illustrating obtaining of a real-time pose according to an example.

In this example, a processor of the vehicle may obtain the real-time pose of the vehicle, as shown in FIG. 2, which includes steps 21 and 22.

In step 21, the processor may obtain inertial data collected by an inertial sensor of the vehicle, pulse data collected by a pulse sensor of the vehicle, and a previous position and a previous navigation angle of a previous cycle of the vehicle.

The inertial sensor of the vehicle may include an acceleration sensor or a gyroscope, and an inertial measurement unit (IMU) of single, dual and/or tri-axial combinations of an acceleration sensor or a gyroscope, or an attitude and heading reference system (AHRS). The inertial sensor measures acceleration data in three spatial directions x, y and z. The vehicle is provided with a reference coordinate system (COG), and the inertial sensor is provided with a coordinate system L, and when a mounting position of the inertial sensor on the vehicle body is known, a conversion relation between the coordinate system L and the coordinate system COG may be determined according to the mounting position of the inertial sensor, and preset into the inertial sensor. Thus, the inertial sensor may convert measured acceleration data into the reference coordinate system in combination with the above conversion relation, to obtain the inertial data of the vehicle.

The pulse sensor of the vehicle may include a magnetoelectric sensor, a Hall sensor, or a photoelectric sensor. The pulse sensor may generate a pulse every turn of rotation of a wheel, that is, the number of turns of rotation of the wheel may be detected based on the pulse data of the pulse sensor, and data of speed, etc. of the vehicle may be determined when a circumference of the wheel is known.

The vehicle is further provided with a positioning sensor, for example, a Beidou positioning module, etc, for collecting position data of the vehicle. In this example, it is considered that the positioning sensor collects position data according to a set period, such that the cycle computed this time may be taken as a current cycle, and one cycle before the current cycle may be taken as a previous cycle.

It will be appreciated that after determining a source of the data, the processor may communicate with a corresponding sensor to obtain corresponding data, for example, the processor communicates with the inertial sensor to obtain the inertial data or communicates with the pulse sensor to obtain the pulse data. Of course, each sensor may store the collected data to a designated location, for example, a local memory, cache, or cloud server, and the processor may read the data from the designated position. Finally, the processor may obtain the inertial data, the pulse data, the previous position, and the previous navigation angle.

In step 22, the processor may compute, based on a preset pose model, a real-time pose of the vehicle in a current collection cycle according to the inertial data, the pulse data, the previous position and the previous navigation angle, where the real-time pose includes a current position and a current navigation angle of the vehicle. The pose model may be represented by Expression (1):

$$\begin{bmatrix} \theta_t \\ x_t \\ y_t \end{bmatrix} = \begin{bmatrix} \theta_{t-1} \\ x_{t-1} \\ y_{t-1} \end{bmatrix} + \begin{bmatrix} \Delta t & 0 \\ 0 & K \cos \theta_{t-1} \\ 0 & K \sin \theta_{t-1} \end{bmatrix} * \begin{bmatrix} \omega - \omega_b \\ \Delta C \end{bmatrix} \quad (1)$$

In Expression (1), θ represents the navigation angle of the vehicle, x, y represent an abscissa and an ordinate of the vehicle respectively, w represents a deflection angular velocity of the vehicle, $\omega_b$ is a deflection angular velocity of the vehicle at time t−1, Δt represents a collection cycle, ΔC represents the change amount of pulse in a cycle, and K is a constant coefficient.

In this example, the processor of the vehicle may obtain a first number of initial texture images, the initial texture images are images pre-stored to the designated position. The designated position stores several initial texture images.

In one example, the processor may take a latest initial texture image in the designated position as a first frame, and select the first number of images in time sequence, so as to obtain the first number of initial texture images, the processing mode is simple, and processing efficiency is high.

In another example, the processor may obtain the first number of images in a collection mode, for example, in one example, obtaining is performed in a time collection mode, in which time data of each initial texture image is used. The processor may obtain the first number of initial texture images by taking a latest initial texture image in a designated position as a first frame and obtaining other initial texture images according to a preset time interval. A time interval between two adjacent frames in the first number of initial texture images is longer than the preset time interval. The preset time interval has a range of 0.1 s-0.5 s, and may be selected according to a specific scene. In this way, the solution of the example obtains images collected in different positions at the time interval, so as to increase a degree of discrimination of the initial texture images, and to avoid influence of the initial texture images that are too similar on a subsequent effect. The solution may be used in scenes with high and low vehicle speeds, and has a better effect in a scene with a low vehicle speed (for example, less than 10 km/h, which is settable).

In another example, obtaining is performed in a spatial sampling mode, in which position data of each initial texture image is used. The processor may obtain the first number of initial texture images by taking a latest initial texture image in a designated position as a first frame and obtaining other initial texture images according to a preset distance threshold. A distance between two adjacent images in the first number of initial texture images is greater than the preset distance threshold. The preset distance threshold has a range of 1 cm-10 cm, and may be selected according to a specific scene. In this way, the solution of the example obtains images collected in different positions by means of the distance threshold, so as to increase a degree of discrimination of the initial texture images, and to avoid influence of the initial texture images that are too similar on a subsequent effect. The solution may be used in scenes with high and low vehicle speeds, and has a better effect in a scene with a high vehicle speed (for example, greater than 40 km/h, which is settable).

In yet another example, the obtaining is performed in a mode of combination of time sampling and spatial sampling. Reference is made to the solutions in a time collection mode and in a spatial sampling mode for a solution of this example, which is not limited herein. In this way, the example may maximize the degree of discrimination between the initial texture images without loss of key frames, and may be used in various vehicle speed scenes having more relaxed vehicle speed requirements, so as to improve accuracy of subsequent images.

Figure 3:
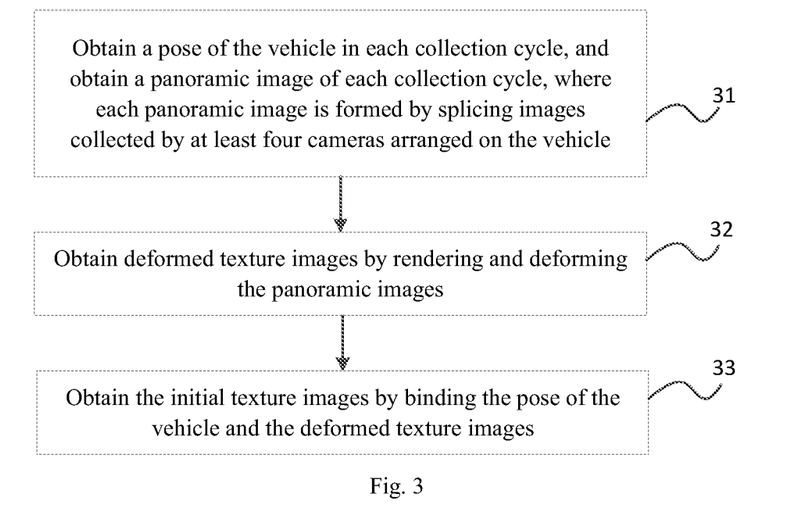
FIG. 3 is a flowchart illustrating obtaining of an initial texture image according to an example.

In one example, the processor may obtain the initial texture images and store same to the designated position, as shown in FIG. 3, which includes steps 31-33.

In step 31, the processor may obtain a pose of the vehicle in each collection cycle, and obtain a panoramic image of each collection cycle, where each panoramic image is formed by splicing images collected by at least four cameras arranged on the vehicle. The step of obtaining a pose in each collection cycle may be seen with reference to the example as shown in FIG. 2, which will not be described in detail. The panoramic image obtained by the processor in each collection cycle is formed by successively splicing the images collected by at least four cameras in one collection cycle according to a sequence (clockwise or counterclockwise) of the cameras. As an example of arranging four cameras on the vehicle, the four cameras face the front, rear, left and right of the vehicle respectively, and a field angle of each camera may have a range of at least 90 degrees, such that the four cameras may cover a range of 360 degrees around the vehicle. In one example, edges of the images obtained by two adjacent cameras in the four cameras are exactly the same edge, and then the processor may splice the four images in a clockwise direction to obtain the panoramic image. In another example, the images obtained by two adjacent cameras in the four cameras have overlapping portions; and the processor may identify the overlapping portions and then splice the four images in the clockwise direction to obtain the panoramic image.

In step 32, the processor may obtain deformed texture images by rendering and deforming the panoramic images. In one example, the processor may obtain intermediate rendered images by rendering the panoramic images in a frame buffer mode. It can be understood that, in practical applications, a processor usually renders an image in a frame buffer mode and then displays same, and in this step, the panoramic images are rendered by using the function of rendering an image in the frame buffer mode, without adding a separate rendering function. Then the processor may obtain the deformed texture images by projecting the intermediate rendered images onto a preset bowl-shaped area for deformation processing.

It should be noted that, the bowl-shaped area is a reference model used during deformation processing, and a shape of the bowl-shaped area matches a shape of a scene in which the vehicle is positioned. The scene in which the vehicle is positioned means that surroundings, collected by the at least four cameras, around the vehicle and the vehicle may constitute the bowl-shaped area, the surroundings which may be collected by each camera constitute a bowl edge and part of a bowl bottom, and the vehicle is positioned at the bowl bottom.

In step 33, the processor may obtain the initial texture images by binding the pose of the vehicle and the deformed texture images. In this step, the processor may bind the pose of the vehicle and the deformed texture images, that is, the position of the vehicle and the deformed texture image in each collection cycle are in one-to-one correspondence, so as to obtain an initial texture image. Then the processor may store the initial texture images to the designated position. Steps 31-33 are repeated, and finally the designated position may store several initial texture images.

In step 12, a first texture image corresponding to each initial texture image is obtained according to the real-time pose and each initial texture image.

Figure 4:
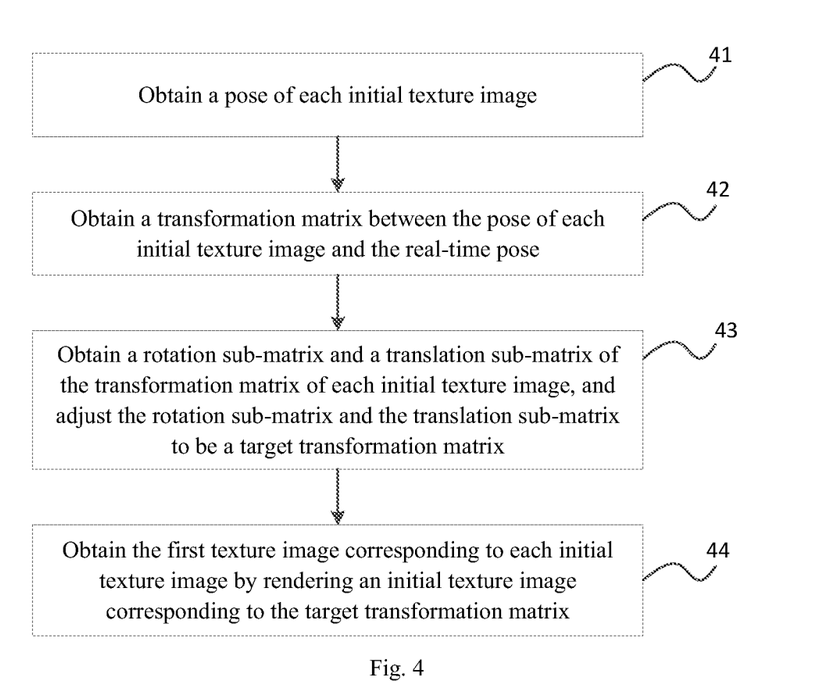
FIG. 4 is a flowchart illustrating obtaining of a first texture image according to an example.

In this example, the processor of the vehicle may obtain the first texture image corresponding to each initial texture image, as shown in FIG. 4, which includes steps 41-44.

In step 41, the processor may obtain a pose of each initial texture image. Each initial texture image includes a pose that may be directly read by the processor. In step 42, the processor may obtain a transformation matrix between the pose of each initial texture image and the real-time pose. In step 43, the processor may obtain a rotation sub-matrix and a translation sub-matrix of the transformation matrix of each initial texture image, and adjust the rotation sub-matrix and the translation sub-matrix to be a target transformation matrix. In step 44, the processor may obtain the first texture image corresponding to each initial texture image by rendering an initial texture image corresponding to the target transformation matrix. Considering that formats of the transformation matrix used in the initial texture image and the transformation matrix used during rendering are different, or positions of same key contents in the transformation matrix used in the initial texture image and the transformation matrix used during rendering are different, steps 41-44 are added in this example, so as to ensure that the contents before and after rendering are consistent and improve the accuracy of rendering.

In step 13, second texture images are obtained by converting the first texture images to a coordinate system in which the vehicle is positioned and obtaining an area corresponding to a bottom of the vehicle.

Figure 5:
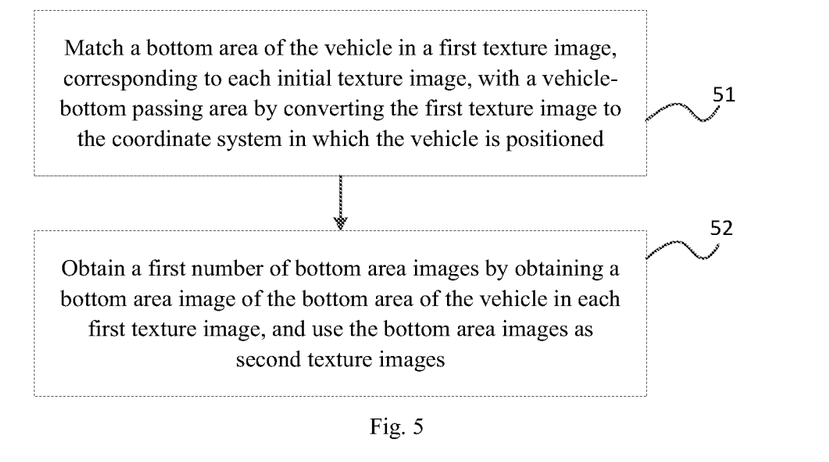
FIG. 5 is a flowchart illustrating obtaining of a second texture image according to an example.

In this example, the processor of the vehicle may obtain the second texture images based on the first texture images, as shown in FIG. 5, which includes steps 51-52. In step 51, the processor may match a bottom area of the vehicle in a first texture image, corresponding to each initial texture image, with a vehicle-bottom passing area by converting the first texture image to the coordinate system (that is, the reference coordinate system COG) in which the vehicle is positioned. In step 52, the processor may obtain a first number of bottom area images by obtaining a bottom area image of the bottom area of the vehicle in each first texture image, and use the bottom area images as second texture images. For example, the processor may obtain coordinate data of a rectangular region of the bottom of the vehicle, and since each first texture image is in the reference coordinate system, the bottom of the vehicle in the first texture images and the actual bottom of the vehicle are in one-to-one correspondence, the processor may cut out bottom area images in the first texture images according to the coordinate data, and use the bottom area images as the second texture images.

In step 14, a target image, representing a scene of the bottom area of the vehicle, is obtained by performing hybrid rendering on the second texture images corresponding to the first number of initial texture images.

In this example, the processor of the vehicle may perform hybrid rendering on the first number of second texture images to obtain the target image. As an example with a MAX strategy, the processor may obtain a maximum value of each color component in pixel points in one position in the first number of bottom area images. Then, the processor may obtain a rendered image, that is, the target image, by updating a value of each color component to a corresponding maximum value. The target images may have uniform display brightness to avoid the uneven brightness problem caused by multi-frame image rendering, so as to improve a display effect.

In another example, the processor may present the target image in a bottom region of a model corresponding to the vehicle for use by the user.

By this point, it can be seen from the above-mentioned examples that the solution provided by the examples of the disclosure may obtain a real-time pose of a vehicle, and obtain a first number of initial texture images; then obtain a first texture image corresponding to each initial texture image according to the real-time pose and each initial texture image; then obtain second texture images by converting the first texture images to a coordinate system in which the vehicle is positioned and obtaining an area corresponding to a bottom of the vehicle; and finally obtain a target image, representing a scene of the bottom area of the vehicle, by performing hybrid rendering on the second texture images corresponding to the first number of initial texture images. In this way, by obtaining the target image of the scene of the bottom area of the vehicle, the example may monitor a condition of a road surface at the bottom of the vehicle, and expand a field of view, that is, reduce a blind area of the field of view, so as to improve safety of the unmanned vehicle.

Figure 6:
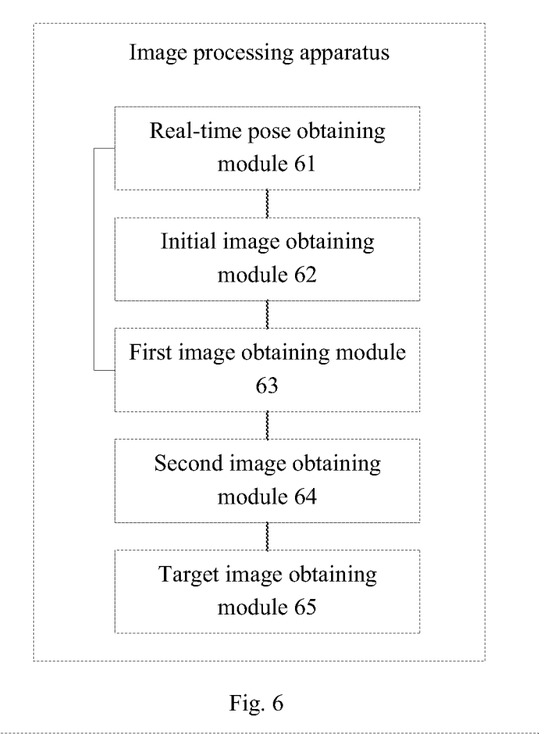
FIG. 6 is a flowchart of an image processing apparatus according to an example.

On the basis of an image processing method provided in the examples of the disclosure, examples of the disclosure also provide an image processing apparatus. With reference to FIG. 6, the image processing apparatus includes:

- a real-time pose obtaining module 61 configured to obtain a real-time pose of a vehicle;
- an initial image obtaining module 62 configured to obtain a first number of initial texture images;
- a first image obtaining module 63 configured to obtain a first texture image corresponding to each initial texture image according to the real-time pose and each initial texture image;
- a second image obtaining module 64 configured to obtain second texture images by converting the first texture images to a coordinate system in which the vehicle is positioned and obtaining an area corresponding to a bottom of the vehicle; and
- a target image obtaining module 65 configured to obtain a target image, representing a scene of the bottom area of the vehicle, by performing hybrid rendering on the second texture images corresponding to the first number of initial texture images.

In an example, the initial image obtaining module 62 includes:

- a first obtaining sub-module configured to obtain the first number of initial texture images by taking a latest initial texture image in a designated position as a first frame and obtaining other initial texture images according to a preset time interval,
- where a time interval between two adjacent frames in the first number of initial texture images is longer than the preset time interval.

In an example, the initial image obtaining module 62 includes:

- a second obtaining sub-module configured to obtain the first number of initial texture images by taking a latest initial texture image stored in the designated position as a first frame and obtaining other initial texture images according to a preset distance threshold,
- where a distance between two adjacent images in the first number of initial texture images is greater than the preset distance threshold.

In an example, the image processing apparatus further includes an initial image generation module configured to generate initial texture images in the designated position, and the initial image generation module 62 includes:

- a vehicle pose obtaining sub-module configured to obtain a pose of the vehicle in each collection cycle;
- a panoramic image obtaining sub-module configured to obtain a panoramic image of each collection cycle, where each panoramic image is formed by splicing images collected by at least four cameras arranged on the vehicle;
- a deformed image obtaining sub-module configured to obtain deformed texture images by rendering and deforming the panoramic images; and
- an initial image obtaining sub-module configured to obtain the initial texture images by binding the pose of the vehicle and the deformed texture images.

In an example, the deformed image obtaining sub-module includes:

- an intermediate image obtaining unit configured to obtain intermediate rendered images by rendering the panoramic images in a frame buffer mode; and
- a deformed image obtaining unit configured to obtain the deformed texture images by projecting the intermediate rendered images onto a preset bowl-shaped area for deformation processing, where a shape of the bowl-shaped area matches a shape of a scene in which the vehicle is positioned.

In an example, the real-time pose obtaining module 61 includes:

- a vehicle data obtaining sub-module configured to obtain inertial data collected by an inertial sensor of the vehicle, the number of a pulse collected by a pulse sensor of the vehicle, and a previous position and a previous navigation angle of a previous cycle of the vehicle; and
- a real-time pose computation sub-module configured to compute, based on a preset pose model, a real-time pose of the vehicle in a current collection cycle according to the inertial data, the pulse data, the previous position and the previous navigation angle, where the real-time pose includes a current position and a current navigation angle of the vehicle.

In an example, the first image obtaining module 63 includes:

- a pose obtaining sub-module configured to obtain a pose of each initial texture image;
- a transformation matrix obtaining sub-module configured to obtain a transformation matrix between the pose of each initial texture image and the real-time pose;
- a target matrix obtaining sub-module configured to obtain a rotation sub-matrix and a translation sub-matrix of the transformation matrix of each initial texture image, and adjust the rotation sub-matrix and the translation sub-matrix to be a target transformation matrix; and
- a first image obtaining sub-module configured to obtain the first texture image corresponding to each initial texture image by rendering an initial texture image corresponding to the target transformation matrix.

In an example, the second image obtaining module 64 includes:

- a first image conversion sub-module configured to match a bottom area of the vehicle in a first texture image, corresponding to each initial texture image, with a vehicle-bottom passing area by converting the first texture image to the coordinate system in which the vehicle is positioned; and
- a bottom image conversion sub-module configured to obtain a first number of bottom area images by obtaining a bottom area image of the bottom area of the vehicle in each first texture image, and use the bottom area images as second texture images.

In an example, the bottom image rendering sub-module includes:

- a color component obtaining unit configured to obtain a maximum value of each color component in pixel points in one position in the first number of bottom area images; and
- a color component updating unit configured to obtain a rendered image by updating a value of each color component to a corresponding maximum value.

In an example, the image processing apparatus further includes:

- a target image presentation module configured to present the target image in a bottom area of a model corresponding to the vehicle.

It will be noted that the image processing apparatus as shown in the example corresponds to the method example, and reference may be made to the contents of the description of the above method example, which will not be repeated in detail here.

Figure 7:
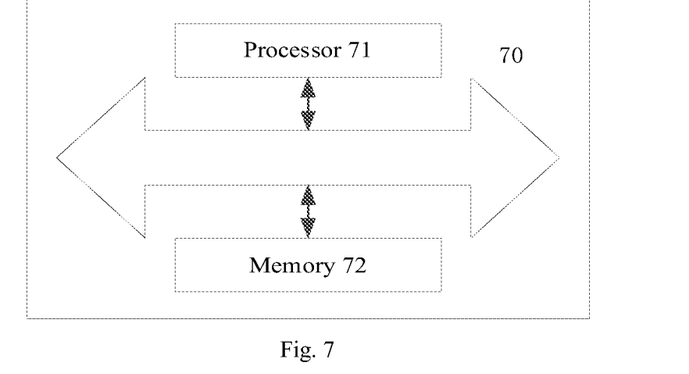
FIG. 7 is a block diagram of a vehicle according to an example.

The examples of the disclosure further provide a vehicle. With reference to FIG. 7, the vehicle includes: a vehicle body 70, and a memory 72 and a processor 71 arranged on the vehicle body 70, where the memory 72 is configured to store a computer program executable by the processor 71; and the processor 71 is configured to execute the computer program in the memory 72 to implement the method as shown in FIGS. 1-5.

In an example, the vehicle 70 further includes at least four cameras, the at least four cameras are arranged at preset position of the vehicle body so as to collect images of corresponding directions of the vehicle; and images collected by the at least four cameras are spliced to obtain a panoramic image, and the panoramic image is used for obtaining an initial texture image.

In an example, the vehicle 70 further includes an inertial sensor and a pulse sensor, the inertial sensor is configured to collect inertial data of the vehicle, and the pulse sensor is configured to collect pulse data of the vehicle; and the inertia data and the pulse data are used to compute a pose of the vehicle.

In an example, the vehicle 70 can further include a positioning sensor, the positioning sensor can be configured to collect a current position of the vehicle, and the current position can be used to compute a pose of the vehicle.

It will be noted that the vehicle as shown in the example of FIG. 7 corresponds to the method example, and reference may be made to the contents of the above description of the method example, which will not be repeated in detail here.

In an example, further provided is a non-transitory computer-readable storage medium, for example, a memory containing an instruction, and the executable computer program is executed by a processor. The readable storage medium may be a read-only memory (ROM), a random access memory (RAM), a compact disc read-only memory (CD-ROM), a magnetic tape, a floppy disk, an optical data storage device, etc.

Additional non-limiting embodiments of the disclosure include:

1. An image processing method, includes:
    obtaining a real-time pose of a vehicle, and obtaining a first number of initial texture images;
    obtaining a first texture image corresponding to each initial texture image according to the real-time pose and each initial texture image;
    obtaining second texture images by converting the first texture images to a coordinate system in which the vehicle is positioned and obtaining an area corresponding to a bottom of the vehicle; and
    obtaining a target image, representing a scene of the bottom area of the vehicle, by performing hybrid rendering on the second texture images corresponding to the first number of initial texture images.

2. The image processing method according to embodiment 1, wherein the obtaining a first number of initial texture images includes:
    obtaining the first number of initial texture images by taking a latest initial texture image in a designated position as a first frame and obtaining other initial texture images according to a preset time interval,
    where a time interval between two adjacent frames in the first number of initial texture images is longer than the preset time interval.

3. The image processing method according to embodiment 1 or 2, wherein the obtaining a first number of initial texture images includes:
    obtaining the first number of initial texture images by taking a latest initial texture image stored in the designated position as a first frame and obtaining other initial texture images according to a preset distance threshold,
    where a distance between two adjacent images in the first number of initial texture images is greater than the preset distance threshold.

4. The image processing method according to embodiment 2, further includes a step of generating initial texture images in the designated position, and the step specifically includes:
    obtaining a pose of the vehicle in each collection cycle, and obtaining a panoramic image of each collection cycle, where each panoramic image is formed by splicing images collected by at least four cameras arranged on the vehicle;
    obtaining deformed texture images by rendering and deforming the panoramic images; and
    obtaining the initial texture images by binding the pose of the vehicle and the deformed texture images.

5. The image processing method according to embodiment 4, wherein the rendering and deforming the panoramic images includes:
    obtaining intermediate rendered images by rendering the panoramic images in a frame buffer mode; and
    obtaining the deformed texture images by projecting the intermediate rendered images onto a preset bowl-shaped area for deformation processing, where a shape of the bowl-shaped area matches a shape of a scene in which the vehicle is positioned.

6. The image processing method according to embodiment 1, wherein the obtaining a real-time pose of the vehicle includes:
    obtaining inertial data collected by an inertial sensor of the vehicle, the number of a pulse collected by a pulse sensor of the vehicle, and a previous position and a previous navigation angle of a previous cycle of the vehicle; and
    computing, based on a preset pose model, a real-time pose of the vehicle in a current collection cycle according to the inertial data, the pulse data, the previous position and the previous navigation angle, where the real-time pose includes a current position and a current navigation angle of the vehicle.

7. The image processing method according to embodiment 1, wherein the obtaining a first texture image corresponding to each initial texture image according to the real-time pose and each initial texture image includes:
    obtaining a pose of each initial texture image;
    obtaining a transformation matrix between the pose of each initial texture image and the real-time pose;
    obtaining a rotation sub-matrix and a translation sub-matrix of the transformation matrix of each initial texture image, and adjusting the rotation sub-matrix and the translation sub-matrix to be a target transformation matrix; and
    obtaining the first texture image corresponding to each initial texture image by rendering an initial texture image corresponding to the target transformation matrix.

8. The image processing method according to embodiment 1, wherein the obtaining second texture images by converting the first texture images to a coordinate system in which the vehicle is positioned and obtaining an area corresponding to a bottom of the vehicle includes:

matching a bottom area of the vehicle in a first texture image, corresponding to each initial texture image, with a vehicle-bottom passing area by converting the first texture image to the coordinate system in which the vehicle is positioned; and obtaining a first number of bottom area images by obtaining a bottom area image of the bottom area of the vehicle in each first texture image, and using the bottom area images as second texture images.

9. The image processing method according to embodiment 8, wherein the obtaining a target image, representing a scene of the bottom area of the vehicle, by performing hybrid rendering on the first number of bottom area images includes:

obtaining a maximum value of each color component in pixel points in one position in the first number of bottom area images; and obtaining a rendered image by updating a value of each color component to a corresponding maximum value, and using the rendered image as a target image representing a scene of the bottom area of the vehicle.

10. The image processing method according to embodiment 1, further includes:

presenting the target image in a bottom area of a model corresponding to the vehicle.

11. An image processing apparatus, includes:

a real-time pose obtaining module configured to obtain a real-time pose of a vehicle;

an initial image obtaining module configured to obtain a first number of initial texture images;

a first image obtaining module configured to obtain a first texture image corresponding to each initial texture image according to the real-time pose and each initial texture image;

a second image obtaining module configured to obtain second texture images by converting the first texture images to a coordinate system in which the vehicle is positioned and obtaining an area corresponding to a bottom of the vehicle; and a target image obtaining module configured to obtain a target image, representing a scene of the bottom area of the vehicle, by performing hybrid rendering on the second texture images corresponding to the first number of initial texture images.

12. The image processing apparatus according to embodiment 11, wherein the initial image obtaining module includes:

a first obtaining sub-module configured to obtain the first number of initial texture images by taking a latest initial texture image in a designated position as a first frame and obtaining other initial texture images according to a preset time interval, where a time interval between two adjacent frames in the first number of initial texture images is longer than the preset time interval.

13. The image processing apparatus according to embodiment 11 or 12, wherein the initial image obtaining module includes:

a second obtaining sub-module configured to obtain the first number of initial texture images by taking a latest initial texture image stored in the designated position as a first frame and obtaining other initial texture images according to a preset distance threshold, where a distance between two adjacent images in the first number of initial texture images is greater than the preset distance threshold.

14. The image processing apparatus according to embodiment 12, further includes an initial image generation module configured to generate initial texture images in the designated position, wherein the initial image generation module includes:

a vehicle pose obtaining sub-module configured to obtain a pose of the vehicle in each collection cycle;

a panoramic image obtaining sub-module configured to obtain a panoramic image of each collection cycle, where each panoramic image is formed by splicing images collected by at least four cameras arranged on the vehicle;

a deformed image obtaining sub-module configured to obtain deformed texture images by rendering and deforming the panoramic images; and an initial image obtaining sub-module configured to obtain the initial texture images by binding the pose of the vehicle and the deformed texture images.

15. The image processing apparatus according to embodiment 14, wherein the deformed image obtaining sub-module includes:

an intermediate image obtaining unit configured to obtain intermediate rendered images by rendering the panoramic images in a frame buffer mode; and a deformed image obtaining unit configured to obtain the deformed texture images by projecting the intermediate rendered images onto a preset bowl-shaped area for deformation processing, where a shape of the bowl-shaped area matches a shape of a scene in which the vehicle is positioned.

16. The image processing apparatus according to embodiment 11, wherein the real-time pose obtaining module includes:

a vehicle data obtaining sub-module configured to obtain inertial data collected by an inertial sensor of the vehicle, the number of a pulse collected by a pulse sensor of the vehicle, and a previous position and a previous navigation angle of a previous cycle of the vehicle; and a real-time pose computation sub-module configured to compute, based on a preset pose model, a real-time pose of the vehicle in a current collection cycle according to the inertial data, the pulse data, the previous position and the previous navigation angle, where the real-time pose includes a current position and a current navigation angle of the vehicle.

17. The image processing apparatus according to embodiment 11, wherein the first image obtaining module includes:

a pose obtaining sub-module configured to obtain a pose of each initial texture image;

a transformation matrix obtaining sub-module configured to obtain a transformation matrix between the pose of each initial texture image and the real-time pose;

a target matrix obtaining sub-module configured to obtain a rotation sub-matrix and a translation sub-matrix of the transformation matrix of each initial texture image, and adjust the rotation sub-matrix and the translation sub-matrix to be a target transformation matrix; and a first image obtaining sub-module configured to obtain the first texture image corresponding to each initial texture image by rendering an initial texture image corresponding to the target transformation matrix.

18. The image processing apparatus according to embodiment 11, wherein the second image obtaining module includes:

a first image conversion sub-module configured to match a bottom area of the vehicle in a first texture image, corresponding to each initial texture image, with a vehicle-bottom passing area by converting the first texture image to the coordinate system in which the vehicle is positioned; and a bottom image conversion sub-module configured to obtain a first number of bottom area images by obtaining a bottom area image of the bottom area of the vehicle in each first texture image, and use the bottom area images as second texture images.

19. The image processing apparatus according to embodiment 18, wherein the bottom image rendering sub-module includes:

a color component obtaining unit configured to obtain a maximum value of each color component in pixel points in one position in the first number of bottom area images; and a color component updating unit configured to obtain a rendered image by updating a value of each color component to a corresponding maximum value.

20. The image processing apparatus according to embodiment 11, further includes:

a target image presentation module configured to present the target image in a bottom area of a model corresponding to the vehicle.

21. A vehicle, includes: a vehicle body, and a memory and a processor arranged on the vehicle body, where the memory is configured to store a computer program executable by the processor; and the processor is configured to execute the computer program in the memory to implement the method according to any one of embodiments 1-10.

22. The vehicle according to embodiment 21, further includes at least four cameras, the at least four cameras are arranged at preset position of the vehicle body so as to collect images of corresponding directions of the vehicle; and images collected by the at least four cameras are spliced to obtain a panoramic image, and the panoramic image is used for obtaining an initial texture image.

23. The vehicle according to embodiment 21, further includes an inertial sensor and a pulse sensor, the inertial sensor is configured to collect inertial data of the vehicle, and the pulse sensor is configured to collect pulse data of the vehicle; and the inertia data and the pulse data are used to compute a pose of the vehicle.

24. The vehicle according to embodiment 21, further includes a positioning sensor, the positioning sensor is configured to collect a current position of the vehicle, and the current position is used to compute a pose of the vehicle.

It can be seen from the above-mentioned examples that the solution provided by the examples of the disclosure may obtain a real-time pose of a vehicle, and obtain a first number of initial texture images; then obtain a first texture image corresponding to each initial texture image according to the real-time pose and each initial texture image; then obtain second texture images by converting the first texture images to a coordinate system in which the vehicle is positioned and obtaining an area corresponding to a bottom of the vehicle; and finally obtain a target image, representing a scene of the bottom area of the vehicle, by performing hybrid rendering on the second texture images corresponding to the first number of initial texture images. In this way, by obtaining the target image of the scene of the bottom area of the vehicle, the example may monitor a condition of a road surface at the bottom of the vehicle, and expand a field of view, that is, reduce a blind area of the field of view, so as to improve safety of the unmanned vehicle.

Other examples of the disclosure will readily occur to those skilled in the art upon consideration of the specification and practical disclosure. The disclosure is intended to cover any variations, uses, or adaptations of the disclosure, and these variations, uses, or adaptations follow general principles of the disclosure and include common general knowledge or customary technical means in the technical field not disclosed in the disclosure. The specification and examples are considered as illustrative only, and a true scope and spirit of the disclosure are indicated by the following claims.

It is to be understood that the disclosure is not limited to the precise structure that has been described above and shown in the accompanying drawings, and that various modifications and changes may be made without departing from its scope. The scope of the disclosure is limited only by the appended claims.

What is claimed is:

1. An image processing method, comprising:
   obtaining a real-time pose of a vehicle, and obtaining a first number of initial texture images;
   obtaining a first texture image corresponding to each initial texture image according to the real-time pose and each initial texture image;
   obtaining second texture images by
      converting the first texture images to a coordinate system in which the vehicle is positioned and obtaining an area corresponding to a bottom of the vehicle,
      matching a bottom area of the vehicle in a first texture image, corresponding to each initial texture image, with a vehicle-bottom passing area by converting the first texture image to the coordinate system in which the vehicle is positioned, and
      obtaining a first number of bottom area images by obtaining a bottom area image of the bottom area of the vehicle in each first texture image, and using the bottom area images as second texture images; and
   obtaining a target image, representing a scene of the bottom area of the vehicle, by performing hybrid rendering on the second texture images corresponding to the first number of initial texture images.

2. The image processing method according to claim 1, wherein the obtaining a first number of initial texture images comprises:
   obtaining the first number of initial texture images by taking a latest initial texture image in a designated position as a first frame and obtaining other initial texture images according to a preset time interval,
   wherein a time interval between two adjacent frames in the first number of initial texture images is longer than the preset time interval.

3. The image processing method according to claim 2, further comprising a step of generating initial texture images in the designated position, wherein the step specifically comprises:
   obtaining a pose of the vehicle in each collection cycle, and obtaining a panoramic image of each collection cycle, wherein each panoramic image is formed by splicing images collected by at least four cameras arranged on the vehicle;
   obtaining deformed texture images by rendering and deforming the panoramic images; and
   obtaining the initial texture images by binding the pose of the vehicle and the deformed texture images.

4. The image processing method according to claim 3, wherein the rendering and deforming the panoramic images comprises:

obtaining intermediate rendered images by rendering the panoramic images in a frame buffer mode; and
obtaining the deformed texture images by projecting the intermediate rendered images onto a preset bowl-shaped area for deformation processing, wherein a shape of the bowl-shaped area matches a shape of a scene in which the vehicle is positioned.

5. The image processing method according to claim 1, wherein the obtaining a first number of initial texture images comprises:
obtaining the first number of initial texture images by taking a latest initial texture image stored in a designated position as a first frame and obtaining other initial texture images according to a preset distance threshold, wherein a distance between two adjacent images in the first number of initial texture images is greater than the preset distance threshold.

6. The image processing method according to claim 1, wherein the obtaining a real-time pose of the vehicle comprises:
obtaining inertial data collected by an inertial sensor of the vehicle, pulse data of the number of a pulse collected by a pulse sensor of the vehicle, and a previous position and a previous navigation angle of a previous cycle of the vehicle; and
computing, based on a preset pose model, a real-time pose of the vehicle in a current collection cycle according to the inertial data, the pulse data, the previous position and the previous navigation angle, wherein the real-time pose comprises a current position and a current navigation angle of the vehicle.

7. The image processing method according to claim 1, wherein the obtaining a first texture image corresponding to each initial texture image according to the real-time pose and each initial texture image comprises:
obtaining a pose of each initial texture image;
obtaining a transformation matrix between the pose of each initial texture image and the real-time pose;
obtaining a rotation sub-matrix and a translation sub-matrix of the transformation matrix of each initial texture image, and adjusting the rotation sub-matrix and the translation sub-matrix to be a target transformation matrix; and
obtaining the first texture image corresponding to each initial texture image by rendering an initial texture image corresponding to the target transformation matrix.

8. The image processing method according to claim 1, wherein the obtaining a target image, representing a scene of the bottom area of the vehicle, by performing hybrid rendering on the first number of bottom area images comprises:
obtaining a maximum value of each color component in pixel points in one position in the first number of bottom area images; and
obtaining a rendered image by updating a value of each color component to a corresponding maximum value, and using the rendered image as a target image representing a scene of the bottom area of the vehicle.

9. The image processing method according to claim 1, further comprising:
presenting the target image in a bottom area of a model corresponding to the vehicle.

10. A vehicle, comprising: a vehicle body, and a memory and a processor arranged on the vehicle body, wherein
the memory is configured to store a computer program executable by the processor; and
the processor is configured to:
obtain a real-time pose of a vehicle, and obtaining a first number of initial texture images;
obtain a first texture image corresponding to each initial texture image according to the real-time pose and each initial texture image;
obtain second texture images by
converting the first texture images to a coordinate system in which the vehicle is positioned and obtaining an area corresponding to a bottom of the vehicle,
matching a bottom area of the vehicle in a first texture image, corresponding to each initial texture image, with a vehicle-bottom passing area by converting the first texture image to the coordinate system in which the vehicle is positioned, and
obtaining a first number of bottom area images by obtaining a bottom area image of the bottom area of the vehicle in each first texture image, and using the bottom area images as second texture images; and
obtain a target image, representing a scene of the bottom area of the vehicle, by performing hybrid rendering on the second texture images corresponding to the first number of initial texture images.

11. The vehicle according to claim 10, further comprising at least four cameras, wherein the at least four cameras are arranged at preset positions of the vehicle body so as to collect images of corresponding directions of the vehicle; and images collected by the at least four cameras are spliced to obtain a panoramic image, and the panoramic image is used for obtaining an initial texture image.

12. The vehicle according to claim 10, further comprising an inertial sensor and a pulse sensor, wherein the inertial sensor is configured to collect inertial data of the vehicle, and the pulse sensor is configured to collect pulse data of the vehicle; and the inertia data and the pulse data are used to compute a pose of the vehicle.

13. The vehicle according to claim 10, further comprising a positioning sensor, wherein the positioning sensor is configured to collect a current position of the vehicle, and the current position is used to compute a pose of the vehicle.

14. A non-transitory computer-readable storage medium, storing a computer program instruction, wherein the program instruction is executed by a processor to:
obtain a real-time pose of a vehicle, and obtaining a first number of initial texture images;
obtain a first texture image corresponding to each initial texture image according to the real-time pose and each initial texture image;
obtain second texture images by
converting the first texture images to a coordinate system in which the vehicle is positioned and obtaining an area corresponding to a bottom of the vehicle,
matching a bottom area of the vehicle in a first texture image, corresponding to each initial texture image, with a vehicle-bottom passing area by converting the first texture image to the coordinate system in which the vehicle is positioned, and
obtaining a first number of bottom area images by obtaining a bottom area image of the bottom area of the vehicle in each first texture image, and using the bottom area images as second texture images; and
obtain a target image, representing a scene of the bottom area of the vehicle, by performing hybrid rendering on the second texture images corresponding to the first number of initial texture images.

15. The non-transitory computer-readable storage medium according to claim 14, wherein the program instruction is further executed by the processor to:
obtain the first number of initial texture images by taking a latest initial texture image in a designated position as a first frame and obtaining other initial texture images according to a preset time interval,
wherein a time interval between two adjacent frames in the first number of initial texture images is longer than the preset time interval.

16. The non-transitory computer-readable storage medium according to claim 15, wherein the program instruction is further executed by the processor to:
obtain a pose of the vehicle in each collection cycle, and obtaining a panoramic image of each collection cycle, wherein each panoramic image is formed by splicing images collected by at least four cameras arranged on the vehicle;
obtain deformed texture images by rendering and deforming the panoramic images; and
obtain the initial texture images by binding the pose of the vehicle and the deformed texture images.

17. The non-transitory computer-readable storage medium according to claim 16, wherein the program instruction is further executed by the processor to:
obtain intermediate rendered images by rendering the panoramic images in a frame buffer mode; and
obtain the deformed texture images by projecting the intermediate rendered images onto a preset bowl-shaped area for deformation processing, wherein a shape of the bowl-shaped area matches a shape of a scene in which the vehicle is positioned.

18. The non-transitory computer-readable storage medium according to claim 14, wherein the program instruction is further executed by the processor to:
obtain the first number of initial texture images by taking a latest initial texture image stored in a designated position as a first frame and obtaining other initial texture images according to a preset distance threshold,
wherein a distance between two adjacent images in the first number of initial texture images is greater than the preset distance threshold.

19. The non-transitory computer-readable storage medium according to claim 14, wherein the program instruction is further executed by the processor to:
obtain inertial data collected by an inertial sensor of the vehicle, pulse data of the number of a pulse collected by a pulse sensor of the vehicle, and a previous position and a previous navigation angle of a previous cycle of the vehicle; and
compute, based on a preset pose model, a real-time pose of the vehicle in a current collection cycle according to the inertial data, the pulse data, the previous position and the previous navigation angle, wherein the real-time pose comprises a current position and a current navigation angle of the vehicle.

* * * * *

UNITED STATES PATENT AND TRADEMARK OFFICE
CERTIFICATE OF CORRECTION

PATENT NO. : 12,222,206 B2
APPLICATION NO. : 17/852772
DATED : February 11, 2025
INVENTOR(S) : Hao Li et al.

Page 1 of 1

It is certified that error appears in the above-identified patent and that said Letters Patent is hereby corrected as shown below:

In the Specification

In Column 3, Line 20, delete "etc," and insert -- etc., --, therefor.

In Column 3, Line 52, delete "w" and insert -- ω --, therefor.

Signed and Sealed this
Fifteenth Day of April, 2025

Coke Morgan Stewart
*Acting Director of the United States Patent and Trademark Office*